(12) United States Patent
Anderson

(10) Patent No.: US 6,348,173 B1
(45) Date of Patent: Feb. 19, 2002

(54) CORE PULLS CONCENTRIC WITH EJECTOR PINS

(75) Inventor: Jeffrey Scott Anderson, Clinton, IA (US)

(73) Assignee: Custom-Pak, Inc., Clinton, IA (US)

( * ) Notice: Subject to any disclaimer, the term of this patent is extended or adjusted under 35 U.S.C. 154(b) by 0 days.

(21) Appl. No.: 09/484,521

(22) Filed: Jan. 18, 2000

Related U.S. Application Data
(60) Provisional application No. 60/116,580, filed on Jan. 21, 1999.

(51) Int. Cl.[7] .......................... B29C 33/44; B29C 49/70
(52) U.S. Cl. ...................... 264/318; 264/334; 425/444; 425/537; 425/DIG. 58
(58) Field of Search ................... 264/318, 334; 425/444, 537, DIG. 58

(56) References Cited

U.S. PATENT DOCUMENTS

| | | | |
|---|---|---|---|
| 1,641,923 A | 9/1927 | Davis | |
| 2,360,011 A | 10/1944 | Popp | |
| 2,510,716 A | 6/1950 | Portmann, Jr. et al. | |
| 2,834,989 A | 5/1958 | Kusnery | |
| 2,843,896 A | 7/1958 | Rinella | |
| 3,577,843 A | 5/1971 | Kutik et al. | 249/67 |
| 3,646,190 A | 2/1972 | Spyra | 264/297 |
| 3,687,591 A * | 8/1972 | Perego | 425/444 |
| 4,076,483 A | 2/1978 | Smirne | 425/444 |
| RE31,476 E | 12/1983 | Mercer | |
| 5,011,398 A | 4/1991 | VanRens | 425/444 |
| 5,368,467 A | 11/1994 | Kleyn | 425/556 |
| 5,736,170 A * | 4/1998 | Stoner | 425/537 |
| 5,804,226 A | 9/1998 | Boskovic | 425/436 RM |

* cited by examiner

Primary Examiner—Robert Davis
(74) Attorney, Agent, or Firm—St. Onge Steward Johnston & Reens LLC

(57) ABSTRACT

A mold core having an upper surface and at least one hole passing therethrough is provided. An ejector pin is disposed within at least one of the holes in the mold core. The ejector pin includes a bushing having an undercut portion protruding above the upper surface of the mold core for enhancing the adherence of a part molded on the mold core thereto. The bushing also has a hole passing laterally therethrough through which passes an ejector pin shaft. The ejector pin shaft, which includes a head, forces a part adhered to the mold core off of the mold core when so desired. The protruding portion of the bushing is undercut in the form of a back-drafted angle, a circumferential rib, either indented or projecting, and of a partially round or V-shaped cross-section, a series of dimples, or of any other shape which will cause the molded plastic to adhere tightly to it. The head of the ejector pin may be located out beyond bushing and may be dome-shaped, conical, or any of other various shapes. Alternately, the head of the ejector pin may be flush with bushing or may be recessed within the bushing.

32 Claims, 4 Drawing Sheets

CORE PULLS CONCENTRIC WITH EJECTOR PINS

This application claims the benefit of U.S. Provisional Application No. 60/116,580, filed Jan. 21, 1999.

FIELD OF THE INVENTION

The present invention relates to an improved mold core, and more particularly to a mold core having improved ejector pins for ejecting a molded piece held against the core.

BACKGROUND OF THE INVENTION

In molding operations, it is often necessary to provide mechanical means to release the part from the mold when the mold opens. This is particularly true in blow molding of double wall parts, since the "core" half of case molds generally contains projecting or "male" sections over which the molten plastic parison drapes as the mold is closing. When the mold is closed, the molten material is pressed against the projecting mold sections by fluid pressure, causing adherence thereto. Additionally, the molten material is cooled, causing it to shrink and solidify and thereby adhere even more firmly to the projecting mold sections. Consequently, when the mold opens, the finished part is held tightly against the core half of the mold, and a substantial force is required to pull, pry or push the part off the mold. The preferred method of doing so is to use core mounted ejector pins movable perpendicular to the plane of the mold parting line to eject the part from the mold.

A problem often arises with the use of these pins, however, in that circumstances can exist in which the part adheres to the cavity side of the mold rather than the core. For example, parts may adhere to the cavity if the cavity contains pronounced textures whose interstices hold the molten plastic as it cools. In addition, cavities may contain sharp edges or undercuts in the area of molded feet, both of which may restrain the part in the cavity half of the mold. Moreover, cavities may contain inwardly projecting areas along their side walls or end walls, such as latch or handle mounts, around which the plastic drapes and adheres just as it does on cores. If the sum of these holding forces in the cavity exceeds the holding forces of the core, the part will stick in the cavity instead of on the core. In such a situation, the core ejector pins are obviously useless. Moreover, cavity ejector pins are impractical from the standpoints of machine and mold construction and appearance of the finished part. Therefore, removal of the part from the cavity half of the mold is difficult as well as disruptive to the regular cycling of the molding machine.

A known prior art method for overcoming this problem has been to cut semicircular or V-shaped groves in the vertical sidewalls of the core parallel to the mold parting line. Such a groove, known as a "core pull," is shown in FIG. 10. These grooves form undercuts which can greatly increase adherence of the part to the core, and which ensure that the part sticks thereon.

Reference is now made to FIGS. 10 and 11, in which prior art cores 110 are shown. Cores 110 include ejector pins 112 and core pull undercuts 114. Ejector pins 112 may have domed heads 116 (as shown in FIG. 10) or flush-mounted heads 118 (as shown in FIG. 11), and may include bushings 120 which are recessed within, and flush with, cores 110 and which have cylindrical outer surfaces.

The core pull undercuts 114, besides being unattractive, themselves cause problems. The ejector pins 112 have to exert more force in order to overcome the resistance of undercuts 114 than they would if undercuts 114 were not provided. This force, which is focused at locations remote from undercuts 114, tends to bow and deform the plastic covering flat surfaces of cores 110. Also, undercuts 114 must be made deep and/or long enough to pull the molded part out of a new cavity. However, a new cavity with new textures and new, sharp machined edges accentuates the problem of the molded part being stuck in the cavity. As the mold wears in, parts tend to stick less in cavities and it becomes desirable to reduce the depth or length of the core pull undercuts 114. However, there is then no easy way to make the large and unsightly core pull undercuts 114 any less so.

What is desired, therefore, is a mold core which ensures that the molded part adheres thereto when the mold is opened, which allows the molded part to be ejected off the mold, which produces a molded part which is aesthetically pleasing, which avoids bowing and deforming of the plastic covering flat surfaces of cores as the molded part is ejected off the mold, and which allows for easy variance of the force required to eject the molded part from the core as the cavity becomes worn in.

SUMMARY OF THE INVENTION

Accordingly, it is an object of the present invention to provide a mold core which ensures that the molded part adheres thereto when the mold is opened.

Another object of the present invention is to provide a mold core having the above characteristics and which allows the molded part to be ejected off the mold.

A further object of the present invention is to provide a mold core having the above characteristics and which produces a molded part which is aesthetically pleasing.

Still another object of the present invention is to provide a mold core having the above characteristics and which avoids bowing and deforming of the plastic covering flat surfaces of cores as the molded part is ejected off the mold.

Yet a further object of the present invention is to provide a mold core having the above characteristics and which allows for easy variance of the force required to eject the molded part from the core as the cavity becomes worn in.

These and other objects of the present invention are achieved by provision of a mold core having an upper surface and at least one hole passing therethrough. An ejector pin is disposed within at least one of the holes in the mold core. The ejector pin includes a bushing having an undercut portion protruding above the upper surface of the mold core for enhancing the adherence of a part molded on the mold core thereto. The bushing also has a hole passing laterally therethrough through which passes an ejector pin shaft. The ejector pin shaft, which includes a head, forces a part adhered to the mold core off of the mold core when so desired.

The protruding portion of the bushing is undercut in the form of a back-drafted angle, a circumferential rib, either indented or projecting, and of a partially round or V-shaped cross-section, a series of dimples, or of any other shape which will cause the molded plastic to adhere tightly to it. The head of the ejector pin may be located out beyond the bushing and may be dome-shaped, conical, or any of other various shapes. Alternately, the head of the ejector pin may be flush with the bushing or may be recessed within the bushing.

The invention and its particular features and advantages will become more apparent from the following detailed description considered with reference to the accompanying drawings.

DETAILED DESCRIPTION OF THE INVENTION

Figure 1:
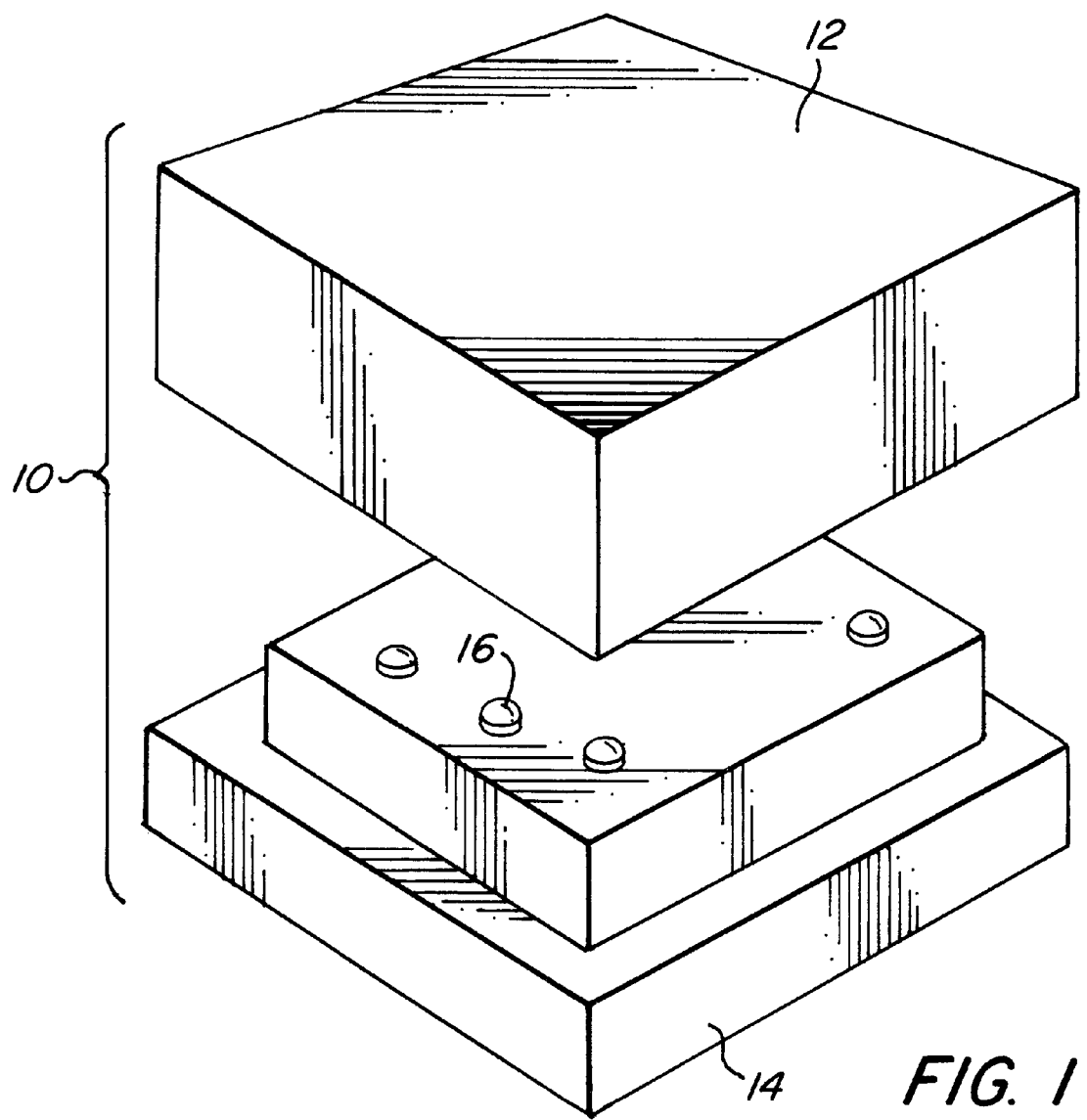
FIG. 1 is a side isometric view of a mold having a mold core in accordance with the present invention.

Referring first to FIG. 1 a mold 10 is shown. Mold 10 includes a mold cavity 12 and a mold core 14 in accordance with the present invention. Blow molding using a mold cavity and a mold core is well known, and therefore, the specifics of such blow molding are not discussed fully herein. It should be noted, however, that unlike the prior art discussed above, mold core 14 does not require core pull undercuts in its vertical sidewalls. Instead, mold core 14 includes at lease one improved ejector pin 16 disposed within at least one hole 18 in mold core 14.

Figures 2, 3:
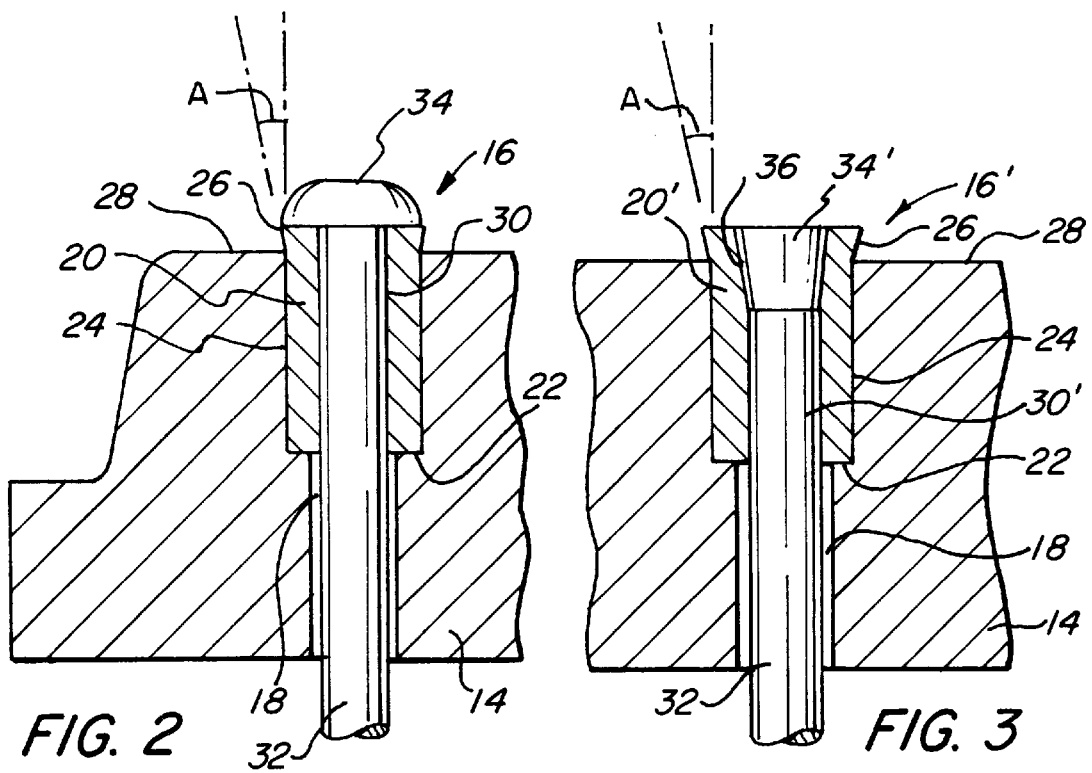
FIGS. 2–4 are partially cross-sectional views of a portion of the mold core of FIG. 1 showing various ejector pin configurations and a bushing having a back-drafted angle.
Figure 4:
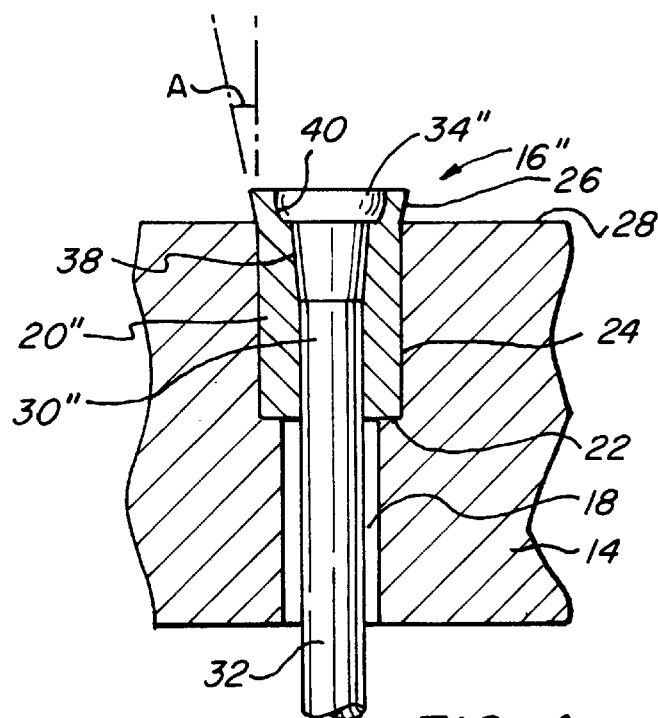

Referring now to FIGS. 2–4, an ejector pin 16 is shown in detail. Ejector pin 16 includes a bushing 20 disposed within hole 18 in mold core 14. As shown in the Figures, hole 18 may include a shoulder 22 above which hole 18 has a larger diameter. Bushing 20 includes a portion 24 having a cylindrical outer wall, the outer diameter of which is substantially the same as the diameter of hole 18 above shoulder 22 so that bushing 20 fits snugly within hole 18 and against shoulder 22. Bushing 20 also includes a portion 26 which protrudes above an upper surface 28 of mold core 14. Protruding portion 26 of bushing 20 is undercut in the form of a back-drafted angle A (as shown in FIGS. 2–4), a circumferential rib (FIGS. 5–8), either indented or projecting, and of a partially round or V-shaped cross-section, a series of dimples (FIG. 9), or of any other shape which will cause the molded plastic to adhere tightly to it, as discussed more fully below.

Bushing 20 also includes a hole 30 passing laterally therethrough, which hole preferably has a diameter the same size as, or slightly smaller than, the diameter of hole 18 in mold core 14 below shoulder 22. Preferably, hole 30 is concentric with protruding portion 26, although such is not strictly necessary. Passing through hole 30 in bushing 20 and hole 18 in mold core 14 is an ejector pin shaft 32. One end of shaft 32 is connected to a motor, a source of fluid pressure, or some other means (not shown) for forcing shaft 32 to extend out past bushing 20 and to thereby exert a force ejecting a molded part stuck on mold core 14.

The other end of shaft 32 includes a head 34. Head 34 may be located out beyond bushing 20 and may be dome-shaped (as shown in FIG. 2), conical, or any of other various shapes. Such a head 34 may be used where it is desirable to mold an indent in an inner wall of a double walled part so as to make the inner and outer walls weld at a point. Such a head 34 also masks any wear which may occur on the top surface 28 of the mold core 14 surrounding the ejector pin shaft 32. When such a head 34 is used, hole 30 in bushing 20 may be substantially cylindrical, as head 34 may be located solely outside of bushing 20. As shown in FIG. 3, head 34' of ejector pin 16' may also be flush with bushing 20. Such a head 34' may be used, for example, where a deep indent in an inner wall of a double walled part is not desired so that the inner and outer walls of the part are not welded at that point. Head 34' may be substantially cylindrical, or as shown in FIG. 3, may be frustoconical to provide a larger head surface in contact with the molded part, in which case, hole 30' in bushing 20' includes a corresponding frustoconical portion 36. As shown in FIG. 4, head 34" of ejector pin 16" may be recessed within bushing 20". In the molded part, this will produce an indented ring, with the center of the ring on the same plane as the mold core outside the ring. Head 34" may be substantially cylindrical, or as shown in FIG. 4, may be frustoconical to provide a larger head surface in contact with the molded part, in which case, hole 30" in bushing 20" includes a corresponding frustoconical portion 38. Hole 30" in bushing 20" may also include a partially rounded section 40 to produce an aesthetically pleasing ring in the molded part.

Figure 5:
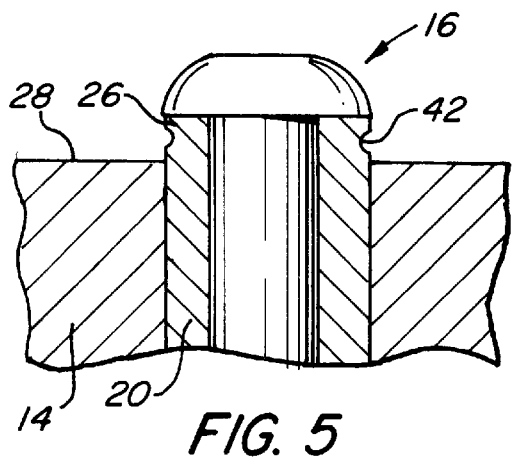
FIGS. 5–9 are partially cross-sectional views of a portion of the mold core of FIG. 1 showing various bushing configurations.
Figure 6:
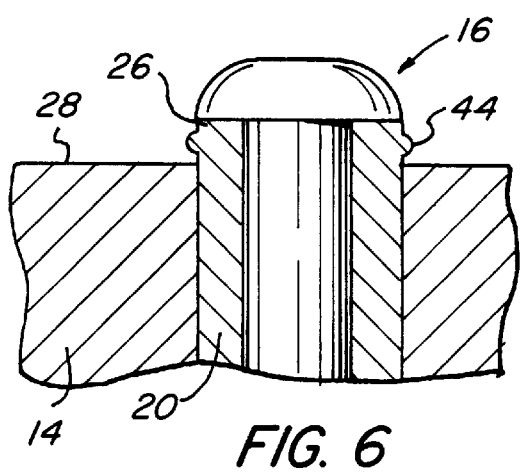
Figure 7:
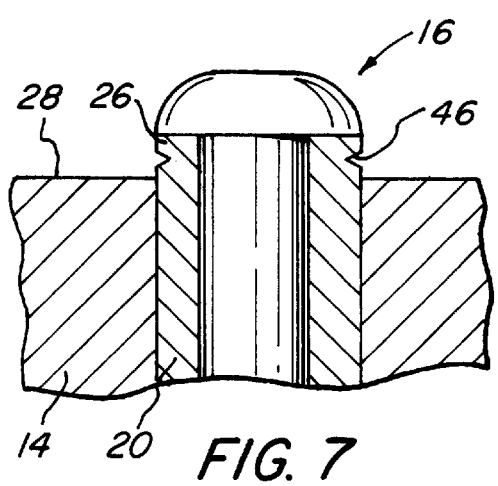
Figure 8:
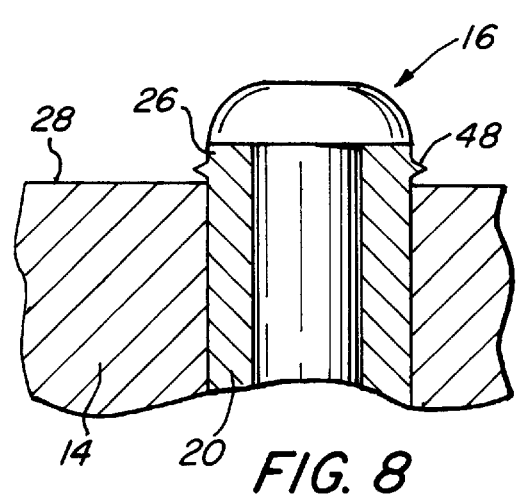
Figure 9:
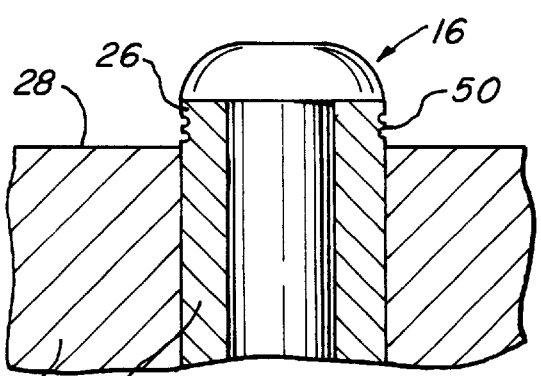
Figure 10:
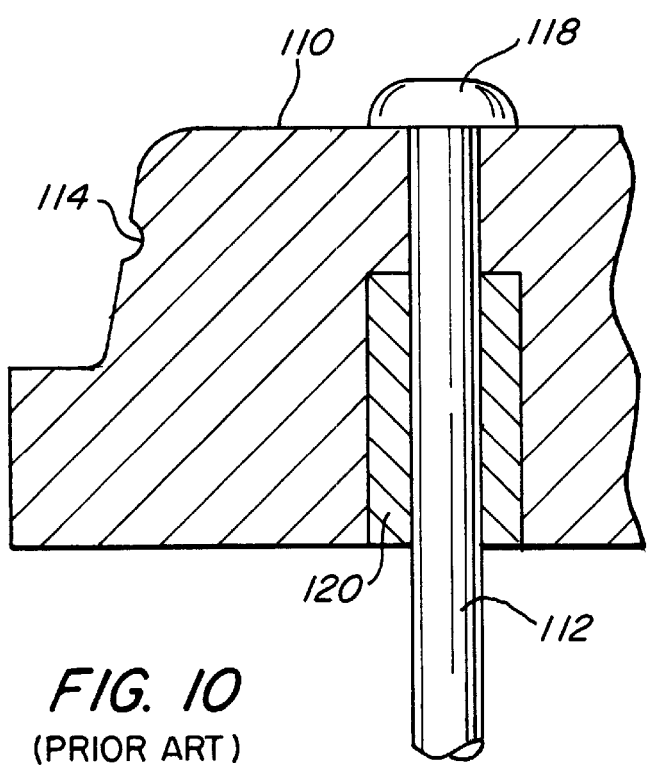
FIGS. 10 and 11 are partially cross-sectional views of prior art mold cores.
Figure 11:
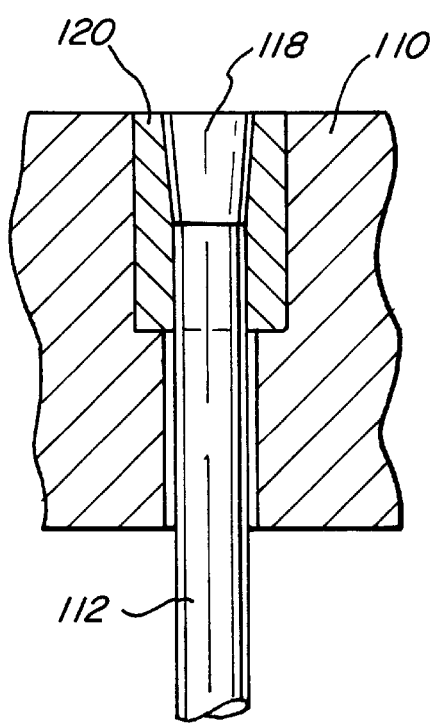

As discussed above, protruding portion 26 of bushing 20 is undercut in the form of a back-drafted angle A, a circumferential rib, either indented or projecting, and of a partially round or V-shaped cross-section, a series of dimples, or of any other shape which will cause the molded plastic to adhere tightly to it. FIGS. 2–4 show protruding portion 26 of bushing 20 having a simple back drafted angle A, while FIG. 5 shows an indented partially round rib 42, FIG. 6 shows a protruding partially round rib 44, FIG. 7 shows an indented rib 46 having a V-shaped cross-section, FIG. 8 shows a protruding rib 48 having a V-shaped cross-section, and FIG. 9 shows a series of dimples 50. It should be understood, however, that many other designs are possible so long as the protruding portion 26 of bushing 20 causes the molded part to adhere thereto when the mold is separated. It should also be understood that the force required to eject the molded part from the core as the cavity becomes worn in can be easily varied. Such can be accomplished by revising or replacing a simple bushing, for example, by providing a bushing having a greater or lesser back drafted angle A, or a smaller or larger rib 42, 44, 46, 48 or dimples 50.

It should also be understood that by eliminating core pull undercuts in the vertical sidewalls of the mold core, part appearance is improved and the bowing and distortion caused by the ejector pins being located remotely from the undercuts is eliminated. Moreover, because the core pulls are located proximate to the ejector pins, ejection of the molded part from the core is positive and more dependable.

The present invention, therefore, provides a mold core which ensures that the molded part adheres thereto when the mold is opened, which allows the molded part to be ejected off the mold, which produces a molded part which is aesthetically pleasing, which avoids bowing and deforming of the plastic covering flat surfaces of cores as the molded part is ejected off the mold, and which allows for easy variance of the force required to eject the molded part from the core as the cavity becomes worn in.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A mold core having an upper surface and at least one hole passing therethrough, an ejector pin being disposed within at least one of the holes, the ejector pin comprising:
   a bushing having an undercut portion protruding above the upper surface of the mold core for enhancing the adherence of a part molded on the mold core thereto, said bushing having a hole passing laterally therethrough; and an ejector pin shaft passing through the hole in said bushing, said ejector pin shaft having a head, said ejector pin shaft for forcing a part adhered to the mold core off of the mold core.

2. The mold core of claim 1 wherein the undercut portion of said bushing comprises a back-drafted angle.

3. The mold core of claim 1 wherein the undercut portion of said bushing comprises a circumferential rib.

4. The mold core of claim 3 wherein the rib comprises an indented partially round rib.

5. The mold core of claim 3 wherein the rib comprises a protruding partially round rib.

6. The mold core of claim 3 wherein the rib comprises an indented V-shaped rib.

7. The mold core of claim 3 wherein the rib comprises a protruding V-shaped rib.

8. The mold core of claim 1 wherein the undercut portion of said bushing comprises a plurality of dimples.

9. The mold core of claim 1 wherein the head of said ejector pin shaft is located outside of said bushing.

10. The mold core of claim 9 wherein the head of said ejector pin comprises a dome-shaped head.

11. The mold core of claim 9 wherein the head of said ejector pin comprises a conical head.

12. The mold core of claim 1 wherein the head of said ejector pin shaft is flush with said bushing.

13. The mold core of claim 12 wherein the head of said ejector pin comprises a frustoconical head.

14. The mold core of claim 1 wherein the head of said ejector pin shaft is recessed within said bushing.

15. A mold comprising
a cavity;
a mold core having an upper surface and at least one hole passing therethrough; and
an ejector pin disposed within at least one of the holes in said mold core, the ejector pin comprising:
a bushing having an undercut portion protruding above the upper surface of the mold core for enhancing the adherence of a part molded on the mold core thereto, said bushing having a hole passing laterally therethrough; and
an ejector pin shaft passing through the hole in said bushing, said ejector pin shaft having a head, said ejector pin shaft for forcing a part adhered to the mold core off of the mold core.

16. The mold core of claim 15 wherein the undercut portion of said bushing comprises a back-drafted angle.

17. The mold core of claim 15 wherein the undercut portion of said bushing comprises a circumferential rib.

18. The mold core of claim 17 wherein the rib comprises an indented partially round rib.

19. The mold core of claim 17 wherein the rib comprises a protruding partially round rib.

20. The mold core of claim 17 wherein the rib comprises an indented V-shaped rib.

21. The mold core of claim 17 wherein the rib comprises a protruding V-shaped rib.

22. The mold core of claim 15 wherein the undercut portion of said bushing comprises a plurality of dimples.

23. The mold core of claim 15 wherein the head of said ejector pin shaft is located outside of said bushing.

24. The mold core of claim 23 wherein the head of said ejector pin comprises a dome-shaped head.

25. The mold core of claim 23 wherein the head of said ejector pin comprises a conical head.

26. The mold core of claim 15 wherein the head of said ejector pin shaft is flush with said bushing.

27. The mold core of claim 26 wherein the head of said ejector pin comprises a frustoconical head.

28. The mold core of claim 15 wherein the head of said ejector pin shaft is recessed within said bushing.

29. A method of molding a part comprising the steps of:
providing a mold having a mold core, the mold core having an upper surface and at least one hole passing therethrough;
providing an ejector pin within at least one of the holes in the mold core, the ejector pin having a bushing with an undercut portion protruding above the upper surface of the mold core;
causing the molded part to adhere to the undercut portion of the bushing, the molded part adhering to the undercut portion of the bushing with an adherence force; and
forcing the molded part adhered to the mold core off the mold core with an ejector pin shaft passing through a lateral hole in the bushing.

30. The method of claim 29 further comprising the step of varying the adherence force by replacing the bushing with another bushing having an undercut portion with different characteristics than the replaced bushing.

31. The method of claim 29 wherein the undercut portion of the bushing comprises a first back-drafted angle and further comprising the step of varying the adherence force by replacing the bushing with another bushing having an undercut portion with a different back-drafted angle than the replaced bushing.

32. The method of claim 29 wherein the undercut portion of the bushing comprises a circumferential rib and further comprising the step of varying the adherence force by replacing the bushing with another bushing having an undercut portion with a different circumferential rib than the replaced bushing.

* * * * *